(12) United States Patent
Faggioli et al.

(10) Patent No.: US 7,382,065 B2
(45) Date of Patent: Jun. 3, 2008

(54) CIRCUIT FOR CONTROLLING INDUCTIVE LOADS, IN PARTICULAR OF ELECTRO ACTUATORS, AT HIGH EFFICIENCY

(75) Inventors: Eugenio Faggioli, Turin (IT); Riccardo Groppo, Orbassano (IT); Paolo Santero, Orbassano (IT); Fabio De Giacomo, Orbassano (IT)

(73) Assignee: CRF Societa Consortile per Azioni, Orbassano (Turin) (IT)

( * ) Notice: Subject to any disclaimer, the term of this patent is extended or adjusted under 35 U.S.C. 154(b) by 267 days.

(21) Appl. No.: 10/867,752

(22) Filed: Jun. 16, 2004

(65) Prior Publication Data

US 2005/0017583 A1  Jan. 27, 2005

(30) Foreign Application Priority Data

Jun. 17, 2003 (IT) .......................... TO2003A0452

(51) Int. Cl.
  *H02M 3/158* (2006.01)
  *H02M 3/135* (2006.01)
  *H01F 7/18* (2006.01)
(52) U.S. Cl. ..................................... 307/125
(58) Field of Classification Search ................. 307/125
  See application file for complete search history.

(56) References Cited

U.S. PATENT DOCUMENTS

| | | | | |
|---|---|---|---|---|
| 5,412,531 A | * | 5/1995 | Clapp, III | 361/190 |
| 5,508,906 A | * | 4/1996 | Nelli et al. | 363/97 |
| 5,965,959 A | * | 10/1999 | Gamble et al. | 307/125 |
| 5,995,356 A | | 11/1999 | Glavmo et al. | |
| 6,157,095 A | * | 12/2000 | Namuduri | 307/125 |
| 2003/0141763 A1 | * | 7/2003 | Tracy et al. | 307/60 |
| 2006/0075994 A1 | * | 4/2006 | Santero et al. | 123/490 |

* cited by examiner

*Primary Examiner*—Michael Sherry
*Assistant Examiner*—Adi Amrany
(74) *Attorney, Agent, or Firm*—Sughrue Mion, PLLC

(57) ABSTRACT

The control circuit comprises a source of dc voltage, a first electronic switch, interposed between a first terminal of the voltage source and a corresponding first terminal of the load, a second electronic switch, interposed between the other or second terminal of the load and the other or second terminal of the source, a current recirculation device, including a diode connected between the said first terminal of the load and the other or second terminal of the voltage source to allow a circulation current in the load when the first switch is open, and a control circuit arranged to control the switches in a predetermined manner. The recirculation device further includes a third electronic switch disposed between the first terminal of the load and the other or second terminal of the voltage source, and the control unit is arranged to control this third switch in a synchronous manner, but in phase opposition, in relation to the first switch.

3 Claims, 2 Drawing Sheets

CIRCUIT FOR CONTROLLING INDUCTIVE LOADS, IN PARTICULAR OF ELECTRO ACTUATORS, AT HIGH EFFICIENCY

BACKGROUND OF THE INVENTION

The present invention relates to a circuit for controlling (at least) an inductive load, in particular an electro actuator, such as a fuel injector for an internal combustion engine.

More specifically, the subject of the invention is a control circuit of the type comprising
 a source of dc voltage,
 a first electronic switch, interposed between a first terminal of the voltage source and a corresponding first terminal of the load,
 a second electronic switch interposed between the other or second terminal of the load and the other or second terminal of the source,
 a current recirculation device, including a diode connected between the first terminal of the load and the other or second terminal of the voltage source, to allow a circulation of current in the load when the first switch is open, and
 an electronic control unit arranged to control the switches in a predetermined manner.

A control circuit of the above-defined type is described for example in U.S. Pat. No. 5,995,356.

In prior art, in such control circuits the current recirculation device is typically a diode, in particular a diode having a high speed and a low direct voltage drop, such as a Schottky diode.

SUMMARY OF THE INVENTION

One object of the present invention is to provide a circuit for controlling one or more inductive loads, comprising current recirculation means which can be formed in a simple and economic manner having a high reliability and operating with a drastically reduced power consumption.

This and other objects are achieved according to the invention with a control circuit of the type initially defined, which is characterised by the fact that
 the recirculation device comprises a third electronic switch disposed between said first terminal of the load and the other or second terminal of the voltage source, and by the fact that
 the control unit is arranged to control the third switch in a synchronised manner, but in phase opposition with respect to the first switch.

BRIEF DESCRIPTION OF THE DRAWINGS

Further characteristics and advantages of the invention will become apparent from the following detailed description, given purely by way of non-limitative example, with reference to the attached drawings, in which.

DETAILED DESCRIPTION OF THE INVENTION

Figure 1:
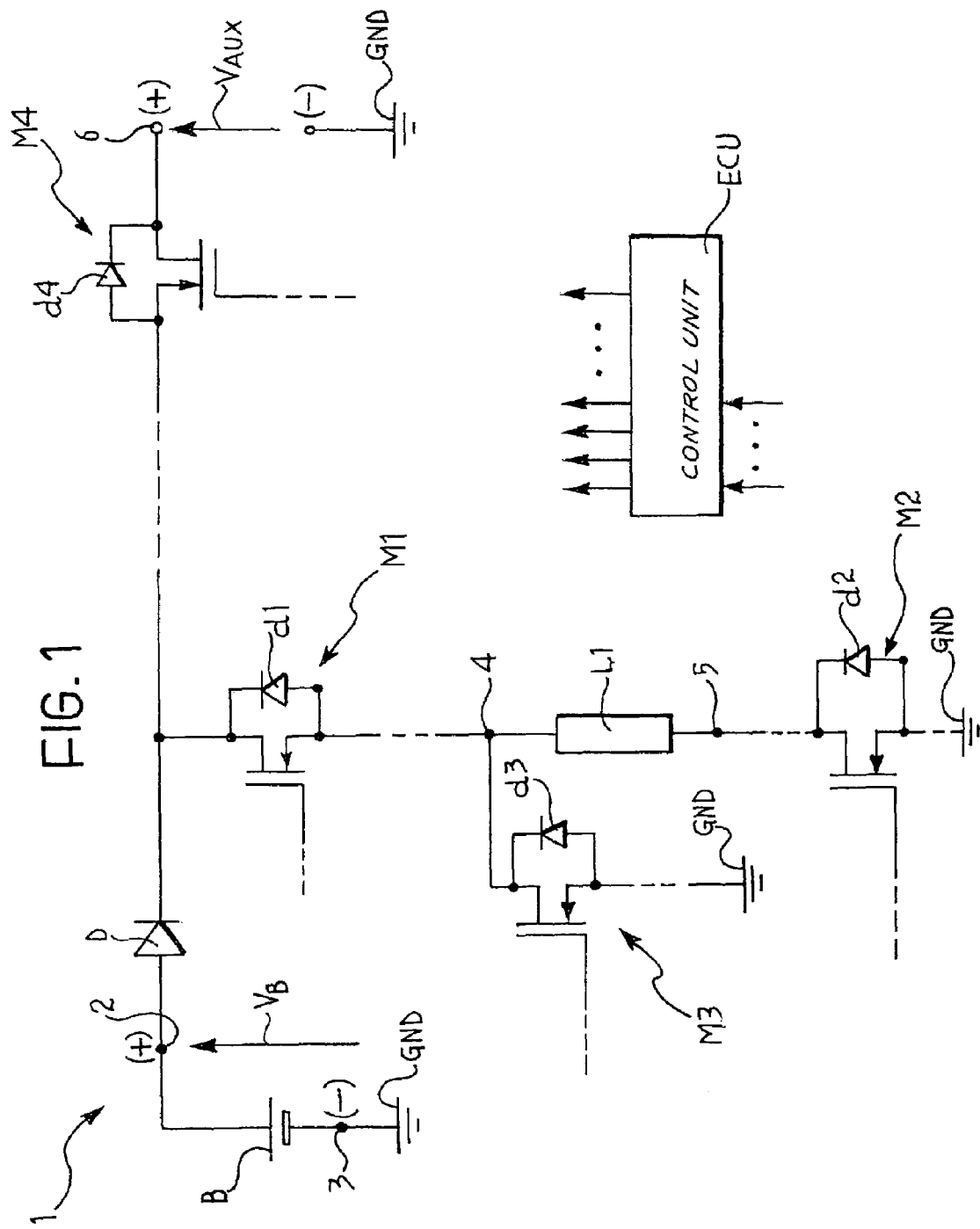
FIG. 1 is a circuit diagram of a control circuit according to the invention.

In FIG. 1 a control circuit according to the invention is generally indicated 1, for highly efficiently controlling an inductive load L1, such as an electro-injector.

The circuit 1 comprises a source B, such as the usual accumulator battery of a motor vehicle operable to deliver a dc voltage $V_B$.

The source B has a positive terminal or pole 2 and a negative terminal or pole 3 connected to ground GND.

The control circuit 1 further includes a first electronic switch M1, conveniently constituted by a MOSFET transistor. Such transistor has its drain connected to the positive pole 2 of the source B through the diode D. This diode has, in particular, its anode connected to the source B and its cathrde connected to the transistor M1.

The source of the transistor M1 is connected to a first terminal 4 of the load L1 and the gate is controlled by a corresponding output of an electronic control unit generally indicated ECU.

In a manner known per se the MOSFET transistor M1 includes an intrinsic diode indicated d1.

A second electronic switch indicated M2 is interposed between the other or second terminal 5 of the load L1 and ground. This switch is also conveniently constituted by a MOSFET transistor, the intrinsic diode of which is indicated d2.

The drain of the transistor M2 is connected to the load L1, the source is connected to ground GND and the gate is coupled to a corresponding output of the control unit ECU.

A further or third electronic switch, indicated M3, is also conveniently constituted by a MOSFET transistor. The intrinsic diode of this transistor is indicated d3.

The transistor M3, as will become more clearly apparent hereinbelow acts to control the recirculation of the current in the load L1 when the transistor M1 is switched off (open).

In particular, the drain of the transistor M3 is connected to the terminal 4 of the load L1, the source is connected to ground GND, and the gate coupled to a corresponding output of the control unit ECU.

As will become more clearly apparent hereinbelow, the transistor M1 is intended to control the flow of current in the load L1. The transistor M2 is closed, or rather conductive, when it is necessary to control the load L1, so as to enable or select this load.

As has been already anticipated, the transistor M3 serves to control the recirculation of the current in the load L1 when, after activation of this load, the transistor M1 is re-opened.

In a variant embodiment not illustrated, a control circuit 1 according to the invention is intended to control a plurality of inductive loads in a selected manner, for example a plurality of electro-injectors, and can thus conveniently include a single switch M1 to which is coupled a plurality of circuit branches each including a respective load, the associated enablement or selection switch and an associated recirculation current control switch.

With reference to FIG. 1, for controlling, that is to say for activation, of the load L1 the control unit ECU renders the transistor M2 and the transistor M1 conductive in such a way as to cause a current to flow in the load L1, which comes from the source B and which, flows through the diode D. In this phase the recirculation transistor M3 is switched off.

When the load L1 is to be de-energised the control unit ECU switches the transistor M1 off and renders the recirculation transistor M3 conductive. This makes it possible to achieve a recirculation of current corresponding to the energy previously stored in the load L1.

In general, in the control circuit 1 according to the invention the recirculation transistor M3 is controlled in a synchronous manner, but in phase opposition relative to the main transistor M1.

The transistor M3 essentially allows the performance of the same function as the simple recirculation diode utilised in the control circuits of the prior art. However, by virtue of the presence of its intrinsic zener diode d3, the transistor M3—suitably piloted—makes it possible to reduce the power consumption (which is substantially equal to $R_{Dson}I^2$) by dividing the power consumption in the current recirculation phase between the transistors M3 and M2. This makes it possible to achieve a reduction in power dissipated between 20% and 30%.

In the diagram of FIG. 1 is shown a further electronic switch M4, conveniently also constituted by a MOSFET transistor. This transistor has its source connected to the cathode of the diode D and its drain connected to a terminal 6 at which, in operation, a higher voltage VAUX is available than the voltage VB of the source B.

The gate of the transistor M4 is likewise controlled by the unit ECU.

The transistor M4 makes it possible to provide a controlled dc voltage of a higher voltage than $V_B$, to achieve a voltage-boost action if and when necessary, or to provide for loss of the source B, in this way allowing the control circuit 1 to operate when connected to a source B the output voltage of which is susceptible of falling in the limit to zero.

The controlled circuit 1 described above allows the current I in an inductive load to be controlled in a reliable and precise manner.

By way of example there is qualitatively shown a variation of the current t in the load as a function of time t which can be achieved with the circuit of the type described above.

Figure 2:
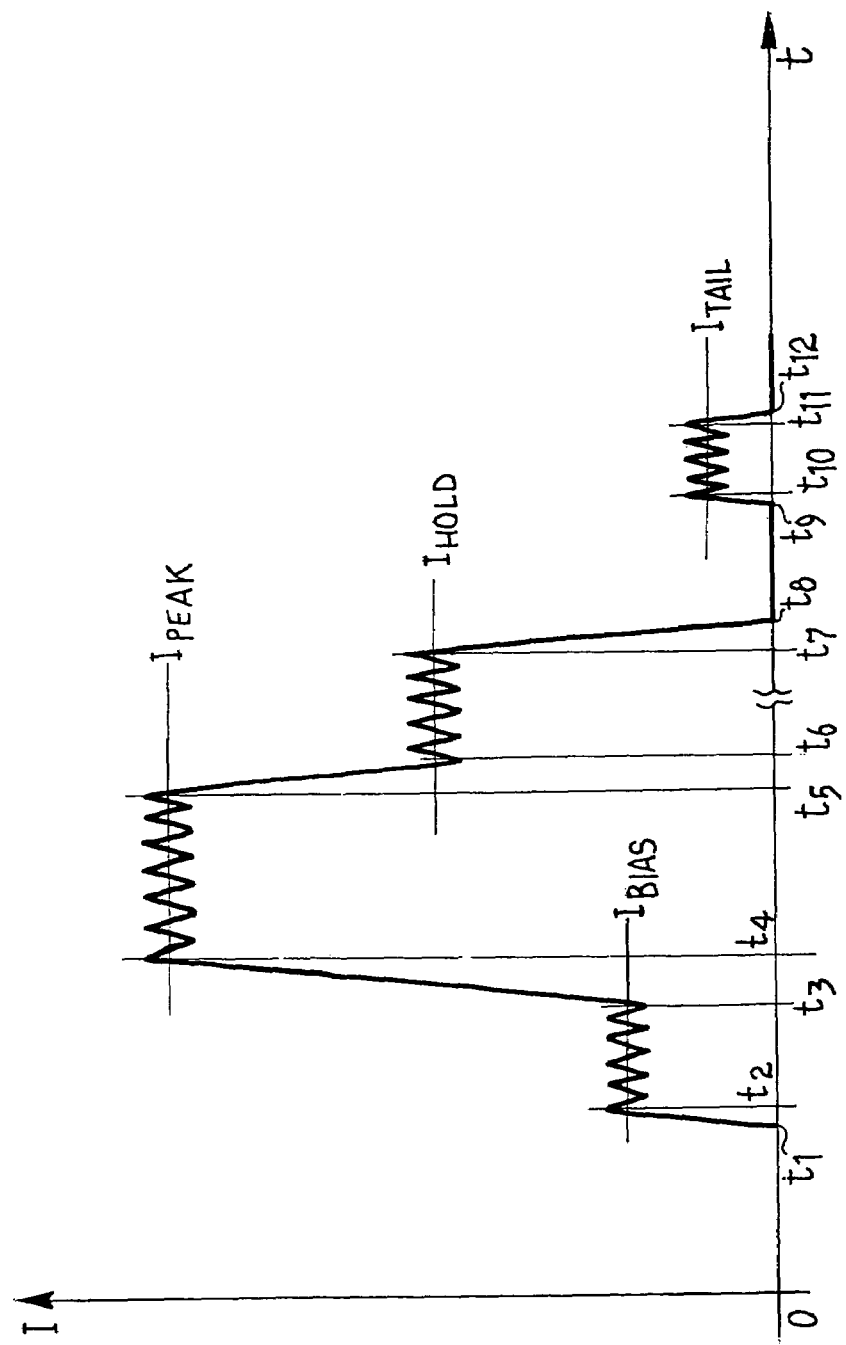
FIG. 2 is a diagram which qualitatively shows an exemplary variation, as a function of time t plotted on the abscissa, of the current I flowing in a load controlled with a control circuit according to the invention.

In the graph of FIG. 2, at an instant t1, conduction of current in the load L1 is started by controlling the transistors M1 and M2 to conduction. As soon (instant t2) as the current in the circuit reaches a predetermined value, the transistor M1 is controlled in an on/off manner in such a way as to maintain the current I in a predetermined range about a predetermined value $I_{BIAS}$. Whilst the transistor M1 is controlled in on/off mode the recirculation transistor M3 is controlled synchronously in off/on mode.

Starting from an instant t3, the control unit ECU causes an increasing current to flow in the load L1, now maintaining the transistor M1 continuously conductive, until reaching (instant t4) a new predetermined current value.

The transistor M1 is now controlled in on/off mode in such a way as to maintain the current I within a predetermined range about a predetermined peak value $I_{PEAK}$, and simultaneously the recirculation transistor M3 is synchronously controlled in an off/on manner.

Subsequently, at an instant t5, the control unit ECU causes opening of the transistors M1 and M2 (and of M4 if it has been conductive). The current I in the load L1 falls rapidly until reaching a predetermined value (instant t6). Having achieved this condition, the unit ECU re-closes M2 and controls M1 in an on/off manner (and M3 in off/on manner) in such a way as to maintain the current in the load L1 about a predetermined maintenance value $I_{HOLD}$. In an analogous manner to that described above with reference to the phase between the instants t5 and t6 the current I in the load L1 is now made to fall, this time to zero, between instants indicated t7 and t8.

The control of the current I can include a further final phase in which the current increases from zero to a predetermined value (between instants t9 and t10), is maintained about the predetermined value $I_{TAIL}$ (between the instants t10 and t11), and then falls again to zero (between the instant t11 and t12).

Naturally, the principle of the invention remaining the same, the embodiments and details of construction can be widely varied with respect to what has been described and illustrated purely by way of non-limitative example, without by this departing from the ambit of the invention as defined in the annexed claims.

What is claimed is:

1. A control circuit for controlling an inductive load, in particular an electro actuator, comprising
   a (first) source of dc voltage,
   a first electronic switch interposed between a first terminal of the voltage source and the corresponding first terminal of the load,
   a second electronic switch interposed in series between the other or second terminal of the load and the other or second terminal of the said source,
   a current recirculation arrangement including a diode connected between the first terminal of the load and the other or second terminal of the voltage source to allow circulation of current in the load when the first switch is open, and
   a control unit arranged to render the second switch conductive when and as long as the load is to be controlled;
   the recirculation arrangement including said second electronic switch, and a third electronic switch disposed between the first terminal of the load and the other or second terminal of the voltage source in parallel to the load and the second electronic switch, and
   the control unit being arranged to control the third switch in a synchronous manner, but in phase opposition, in relation to the first switch.

2. A control circuit according to claim 1, further including a second dc voltage source able to deliver a higher voltage than that of said first source and in which there is provided at least a fourth electronic switch which is interposed between said second voltage and the first switch; the control unit being arranged to control said fourth switch in a predetermined manner.

3. A control circuit according to claim 1, in which said third switch is a MOSFET transistor and the associated recirculation diode is the intrinsic diode of this transistor.

* * * * *